(12) United States Patent
Tekavec

(10) Patent No.: US 9,358,942 B1
(45) Date of Patent: Jun. 7, 2016

(54) AUTOMOBILE BUMPER PROTECTOR AND METHOD OF USE

(71) Applicant: Robert Tekavec, Brooklyn, NY (US)

(72) Inventor: Robert Tekavec, Brooklyn, NY (US)

(*) Notice: Subject to any disclaimer, the term of this patent is extended or adjusted under 35 U.S.C. 154(b) by 0 days.

(21) Appl. No.: 14/644,413

(22) Filed: Mar. 11, 2015

(51) Int. Cl.
*B60R 19/44* (2006.01)

(52) U.S. Cl.
CPC ..................................... *B60R 19/44* (2013.01)

(58) Field of Classification Search
CPC ........ B60R 19/44; B60R 19/50; B60R 13/04; B60R 13/105; B60R 13/043; B60R 19/26; B60R 19/445; B60R 19/483; B60R 2011/0096; B60J 11/06; B60J 11/02
USPC .......... 280/770; 293/142, 128, 117, 119, 132, 293/102, 109, 120, 126; 340/435, 436, 605, 340/612, 614
See application file for complete search history.

(56) References Cited

U.S. PATENT DOCUMENTS

| | | | |
|---|---|---|---|
| 3,665,355 A | 5/1972 | Sasaki et al. | |
| 4,498,697 A | 2/1985 | McGlove et al. | |
| 4,643,471 A * | 2/1987 | Fishback | B60J 11/06 280/770 |
| 4,690,446 A | 9/1987 | Warren | |
| 5,056,817 A * | 10/1991 | Fuller | B60R 99/00 150/166 |
| 5,176,421 A | 1/1993 | Fasiska | |
| 5,370,430 A | 12/1994 | Mozafari | |
| 5,533,287 A * | 7/1996 | Cole | G09F 21/048 40/533 |
| 5,618,073 A | 4/1997 | Criscione | |
| 5,697,416 A * | 12/1997 | Bock | B60J 11/08 150/168 |
| 6,186,564 B1 | 2/2001 | Ashcroft | |
| 6,283,518 B1 | 9/2001 | Burtin | |
| 6,572,163 B1 | 6/2003 | Pickett | |
| D508,222 S | 8/2005 | Tekavec | |
| 7,073,830 B1 | 7/2006 | Chen et al. | |
| 7,740,294 B2 | 6/2010 | Malina et al. | |
| 7,866,715 B2 | 1/2011 | Malina et al. | |
| D640,618 S | 6/2011 | Lorenzo | |
| 8,047,601 B2 | 11/2011 | Malina et al. | |
| 8,083,260 B2 | 12/2011 | Haynes | |
| 8,393,658 B2 | 3/2013 | Malina et al. | |
| 8,531,282 B1 | 9/2013 | Santiago | |
| 8,850,727 B2 | 10/2014 | Malina et al. | |
| 2008/0116703 A1 | 5/2008 | Malina et al. | |
| 2009/0091145 A1 | 4/2009 | Malina et al. | |
| 2010/0276951 A1 | 11/2010 | Malina et al. | |
| 2011/0068592 A1 | 3/2011 | Malina et al. | |
| 2013/0047476 A1 | 2/2013 | Malina et al. | |
| 2013/0320684 A1 * | 12/2013 | Darrett | B60R 13/04 293/118 |

* cited by examiner

*Primary Examiner* — Glenn Dayoan
*Assistant Examiner* — Sunsurraye Westbrook
(74) *Attorney, Agent, or Firm* — Hartman Global IP Law; Gary M. Hartman; Domenica N. S. Hartman

(57) ABSTRACT

A bumper protector and method for protecting a bumper of an automobile. The protector includes a main body that has oppositely-disposed upper and lower ends and oppositely-disposed lateral ends. The upper end of the main body is adapted to be secured to an automobile portion above the bumper, so that the main body covers at least a portion of an outer surface of the bumper. The protector further includes wing extensions that are deployable from the main body by extending each wing extension from a stowed position thereof to a deployed position in which the extensions are deployed from the lateral ends of the main body. The wing extensions are securable to the automobile so that at least portions of the lateral surfaces of the bumper are covered with the wing extensions.

20 Claims, 8 Drawing Sheets

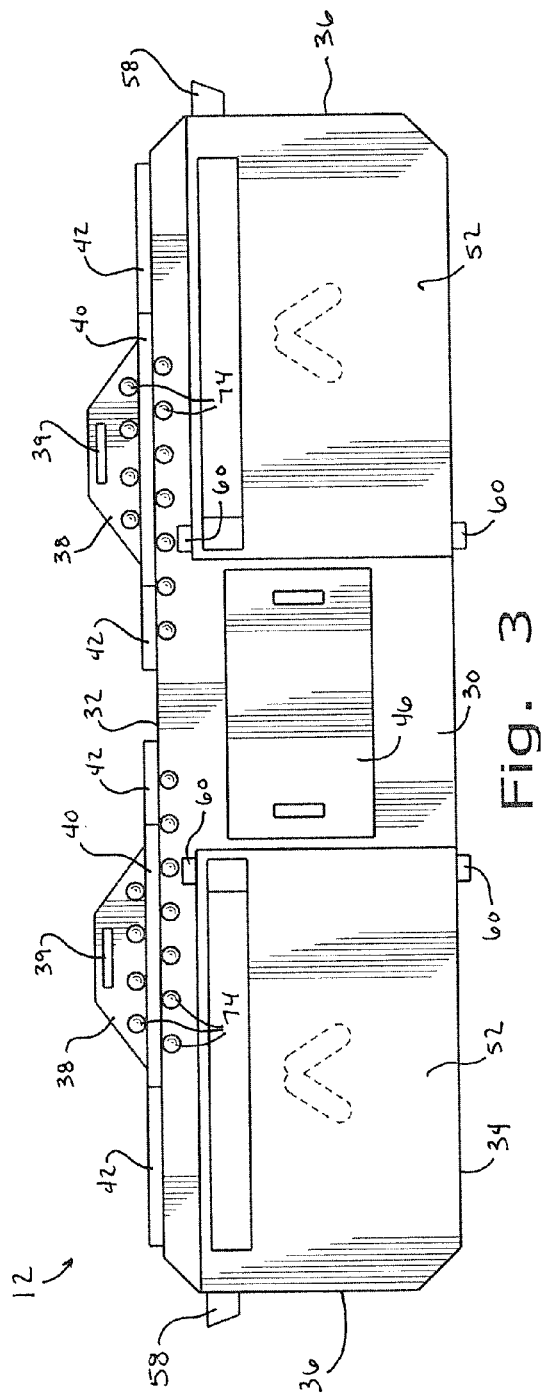
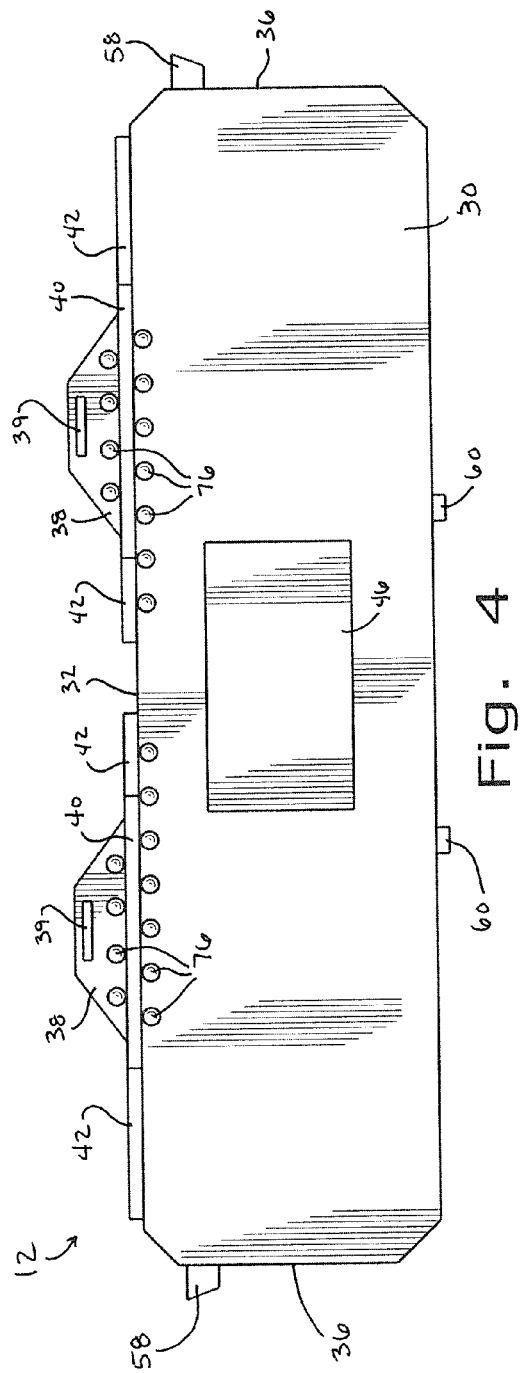

AUTOMOBILE BUMPER PROTECTOR AND METHOD OF USE

BACKGROUND OF THE INVENTION

The present invention generally relates to automobile accessories. The invention particularly relates to accessories adapted to protect exterior regions of automobiles.

Accessories adapted to protect exterior regions of automobiles are well known. Particular examples, referred to herein as bumper protectors, are specifically adapted to cover bumpers of vehicles, often the rear bumper of a vehicle, to protect the bumper from minor scuffs, scrapes and other damage that can occur from contact with other vehicles during parking maneuvers along congested streets, in crowded parking lots, etc. A common limitation of bumper protectors is that they typically cover only middle portions of a bumper, such that their lateral end portions (corners) remain exposed and unprotected. Though bumper protectors have been proposed that are capable of wrapping around the corners of a bumper, these products are typically complicated in their design and use, are often bulky, and often require a relatively large storage space in the trunk of the vehicle. In addition, the method of attachment often requires the use of elastic straps that are designed to be hooked to the rear wheel wells of the vehicle.

In view of the above, current bumper protectors often have the disadvantage of being large and bulky accessories that are awkward to handle during removal from storage and during positioning and securement to the bumper, with the result that the protector is likely to come into contact with the ground, puddles, litter, etc., beneath and around the bumper. The same issues arise when removing the protector, with the result that the protector is often soiled and/or wet when it is returned to the trunk of the vehicle.

Another issue with certain existing bumper protectors is that their upper ends often straddle or are wrapped over the upper edge of the bumper. With repeated use, this manner of attachment can lead to the inner surface of the protector scuffing and dulling the bumper, especially if the protector was soiled during its installation. Because the protector constantly contacts the surface of the bumper during use, further scuffing and rubbing are likely to occur whenever there is relative movement between the protector and bumper, for example, due to wind or if the vehicle is inadvertently driven while the protector is still on the bumper.

Yet another known issue with current bumper protectors is that, though there may be an opening or provisions for creating an opening through which a vehicle's bumper-mounted license plate remains visible while the protector is mounted to the bumper, the opening is unnecessary if the owner purchases a new vehicle that does not have a bumper-mounted license plate.

In view of the above, it can be appreciated that there are various problems, shortcomings or disadvantages associated with existing bumper protectors.

BRIEF DESCRIPTION OF THE INVENTION

The present invention provides apparatuses suitable for protecting bumpers of automobiles, and to methods of using such bumper protectors.

According to one aspect of the invention, a bumper protector includes a main body having oppositely-disposed upper and lower ends and oppositely-disposed lateral ends. The protector further includes means for securing the upper end of the main body to an automobile portion above the bumper, and wing extensions configured to be deployed from the main body. Each of the wing extensions has a stowed position in which the wing extension is stowed with the main body, and a deployed position in which the wing extension is deployed from a corresponding one of the lateral ends of the main body. The main body is adapted to cover at least a portion of an outer surface of the bumper that is between two lateral surfaces of the bumper and below an upper surface of the bumper, whereas the wing extensions are adapted to cover at least portions of the lateral surfaces of the bumper. The protector also includes means for securing the wing extensions to the automobile.

Another aspect of the invention is a method of using a protector comprising the elements described above to protect a bumper.

Yet another aspect of the invention is a method of protecting a bumper of an automobile, wherein the bumper has an outer surface between two lateral surfaces of the bumper and below an upper surface of the bumper. The method includes providing a bumper protector comprising a main body that has oppositely-disposed upper and lower ends and oppositely-disposed lateral ends, securing the upper end of the main body to an automobile portion above the bumper, covering at least a portion of the outer surface of the bumper with the main body, deploying wing extensions from the main body by extending each of the wing extensions from a stowed position thereof in which the wing extensions are stowed with the main body to a deployed position thereof in which the wing extensions are deployed from a corresponding one of the lateral ends of the main body, covering at least portions of the lateral surfaces of the bumper with the wing extensions, and then securing the wing extensions to the automobile.

Technical effects of bumper protectors and methods of the types described above preferably include the capability of the protector to be readily installed and removed from a bumper, with a reduced risk of damaging the bumper during installation and removal and also while the protector is in use.

Other aspects and advantages of this invention will be better appreciated from the following detailed description.

BRIEF DESCRIPTION OF THE DRAWINGS

FIGS. 3 and 4 are, respectively, front and rear elevational views of the bumper protector of FIGS. 1 and 2.

DETAILED DESCRIPTION OF THE INVENTION

Figure 1:
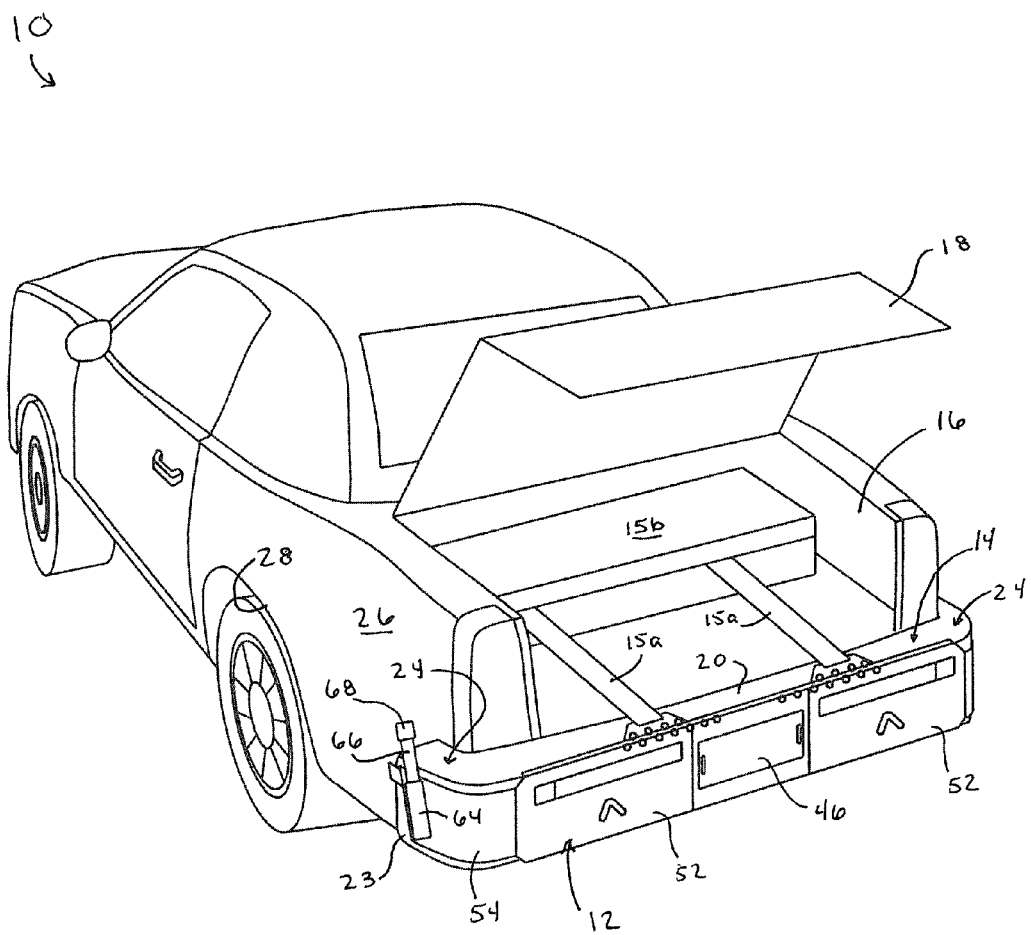
FIG. 1 is a perspective view depicting a bumper protector installed on an automobile in accordance with a nonlimiting embodiment of this invention.
Figure 2:
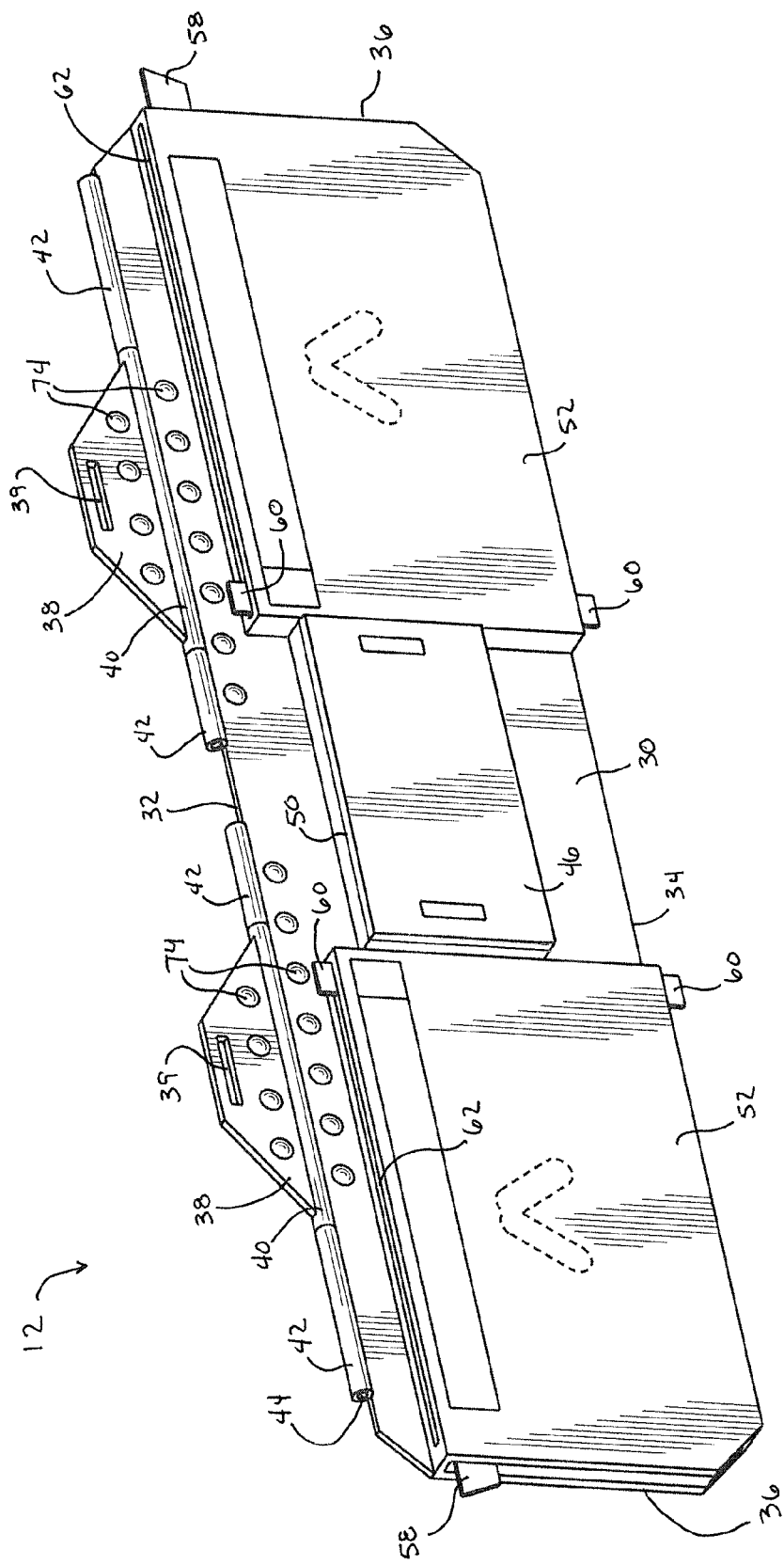
FIG. 2 is a perspective view of the bumper protector shown in FIG. 1
Figure 5:
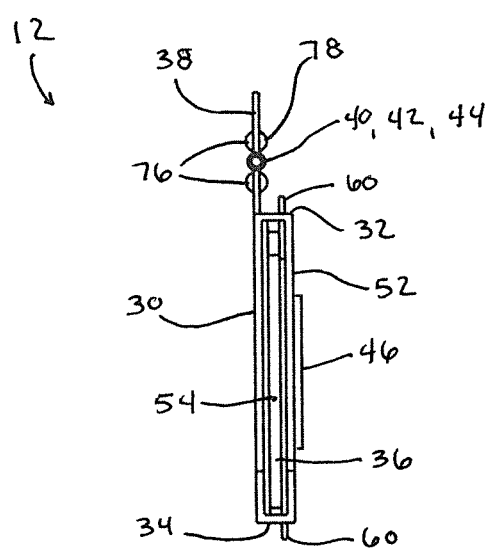
FIG. 5 is a left elevational view of the bumper protector of FIGS. 1 to 4.

FIG. 1 represents an automobile 10 on which a bumper protector 12 has been installed to protect a rear bumper 14 of the automobile 10. Although the invention will be described hereinafter in reference to the automobile 10 shown in the drawings, it will be appreciated that the teachings of the invention are more generally applicable to various types of passenger vehicles, and as such are not limited to vehicles of the type represented in FIG. 1. In addition, it should be noted that the drawings are drawn for purposes of clarity when viewed in combination with the following description, and therefore are not necessarily to scale. To facilitate the description of the bumper protector 12 provided below, relative terms, including but not limited to, "vertical," "horizontal," "lateral," "front," "rear," "side," "forward," "rearward," "upper," "lower," "above," "below," "right," "left," etc., may be used in reference to the orientation of the bumper protector 12 as installed on the bumper 14 of the automobile 10, and therefore are relative terms that indicate the construction, installation and use of the protector 12 on a vehicle and therefore help to define the scope of the invention.

As evident from FIG. 1, the bumper protector 12 is mounted to the automobile 10 with the assistance of one or more trunk straps 15s that enable the protector 12 to be anchored by any suitable means 15b to the interior of the vehicle's trunk 16. The protector 12 is preferably sized to be conveniently stowed in the trunk 16, and the lid 18 is closed onto the straps 15a to reduce the risk of theft of the protector 12 after it is deployed outside of the trunk 16. The straps 15a are preferably reinforced, for example, with steel chords, to further reduce the risk of theft. FIG. 1 further depicts the protector 12 as being suspended below an upper surface 20 of the bumper 14 and as covering an outer surface 22 of the bumper 14 disposed between two lateral surface regions 23 of the bumper 14, which face laterally outward away from the outer surface 22. The lateral surface regions 23 are disposed at lateral ends 24 of the bumper 14 that partially wrap toward and potentially around the rear quarter panels 26 of the automobile 10. Notably, installation and deployment of the protector 12 do not require any hooks or other means to attach the protector 12 to the rear wheel wells 28 of the automobile 10.

FIGS. 2 through 5 represent various views of the bumper protector 12 depicted in FIG. 1, and FIGS. 6 through 9 represent various steps that may be performed to deploy and secure the bumper protector 12 to a vehicle, such as the automobile 10 of FIG. 1. The protector 12 can generally be described as comprising a main body (hereinafter, mat) 30 having oppositely-disposed upper and lower ends 32 and 34 and two oppositely-disposed lateral ends 36. A pair of flanges 38 are shown as mounted to the upper end 32 of the mat 30, each with a feature 39 with which one of the trunk straps 15a can be secured to the flange 38. Various approaches can be employed to secure the straps 15a to the flanges 38, and preferred approaches result in the straps 15a being secured so that the straps 15a, flanges 38, or other portions of the protector 12 must be destroyed or damaged in order to remove the protector 12 from the automobile 10 while the straps 15a secure the protector 12 to the automobile 10. In the particular embodiment shown, each flange 38 has a channel 40 nested between two channels 42 that are attached to the upper end 32 of the mat 30 so that openings within the channels 40 and 42 are aligned to permit the insertion of a rod 44 to pivotally couple and secure the flange 38 to the mat 30. The rods 44 are preferably secured to the channels 40 and 42 in some manner so that the channels 40 and 42, flanges 38, or other portions of the protector 12 must be destroyed or damaged in order to remove the flanges 38 from the protector 12.

Figure 7:
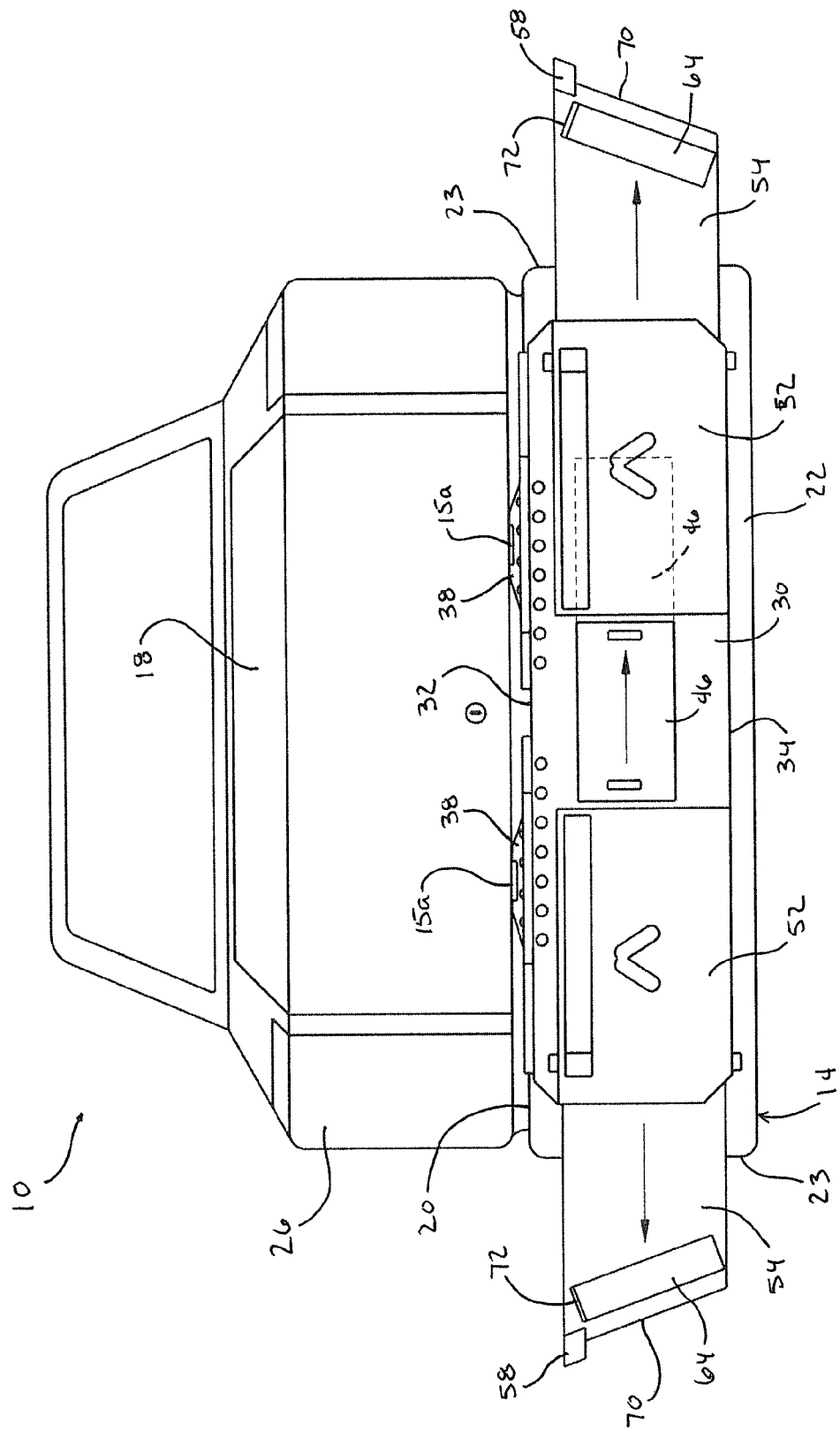
FIGS. 7 and 8 are rear views of the automobile depicting additional steps performed during installation of the bumper protector of FIGS. 1 through 5.
Figure 8:
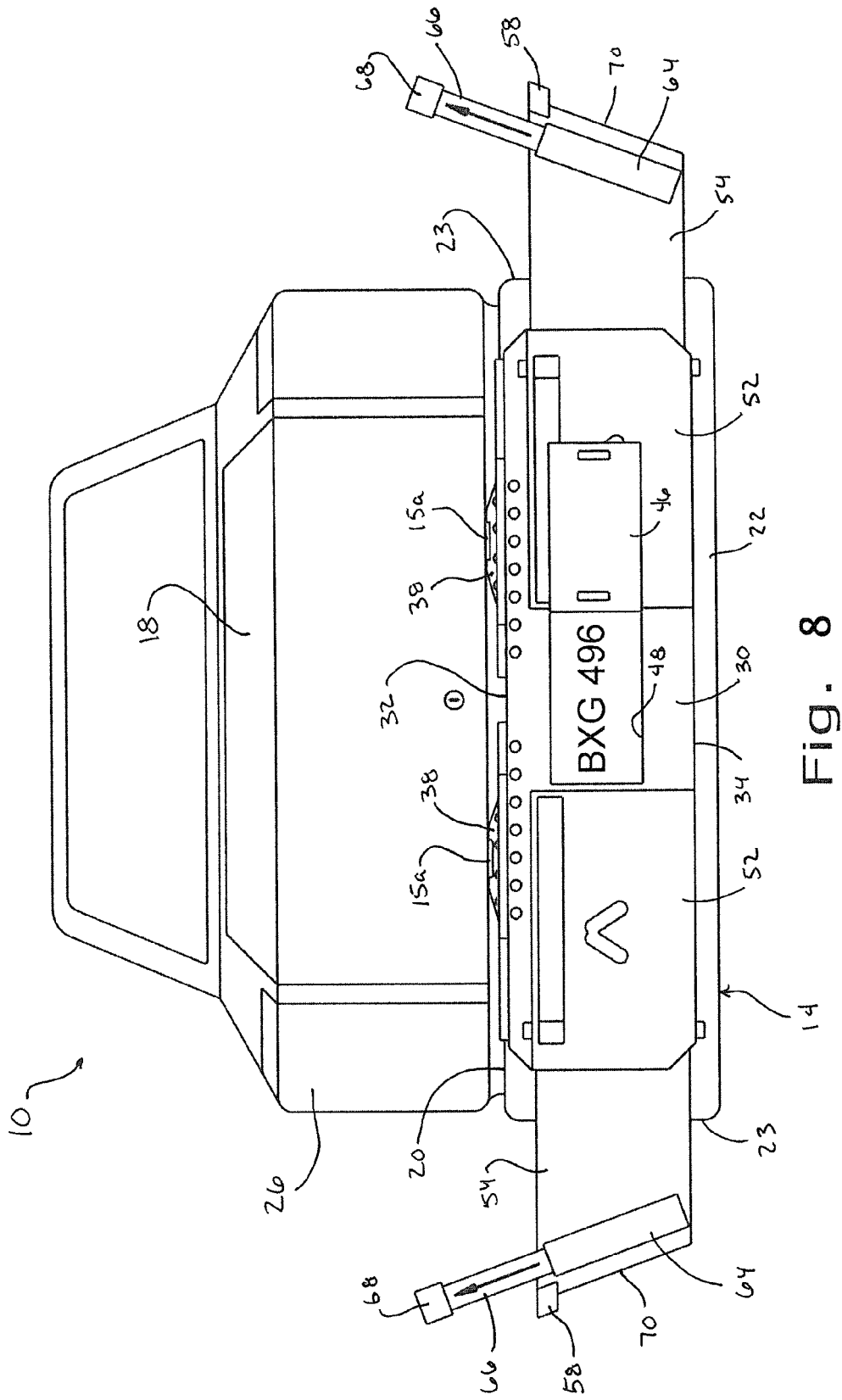

The rear or outer surface of the mat 30 (for example, visible in FIGS. 1, 2 and 3) carries various components of the protector 12 capable of providing certain preferred features of the protector 12. One such feature is a license plate cover 46 that, as evident from FIG. 7, can be slid in a lateral direction of the protector 12 along a track 50 (FIG. 2) to uncover an opening 48 centrally disposed in the mat 30, through which a license plate of the automobile 10 can be exposed (FIG. 8). Also provided are two compartments 52, each housing a deployable wing extension 54 seen in FIGS. 7 through 9. Each compartment 52 has an opening 56 at a corresponding one of the lateral ends 36 of the mat 30 through which its wing extension 54 can be deployed as a result of being extended from a cavity within the compartment 52 (as seen in FIG. 7) and stowed as a result of being retracted into the cavity of the compartment 52 (as seen in FIGS. 2 through 4 and 6). Deployment of the wing extensions 54 can be performed by grasping tabs 58 that protrude from the compartments 52 when the wing extensions 54 are stowed. Lateral movement of each wing extension 54 can be limited with a stop tab 60 that protrudes through a slot 62, which are represented as being located along the upper and lower ends of the compartment 52.

Figure 9:
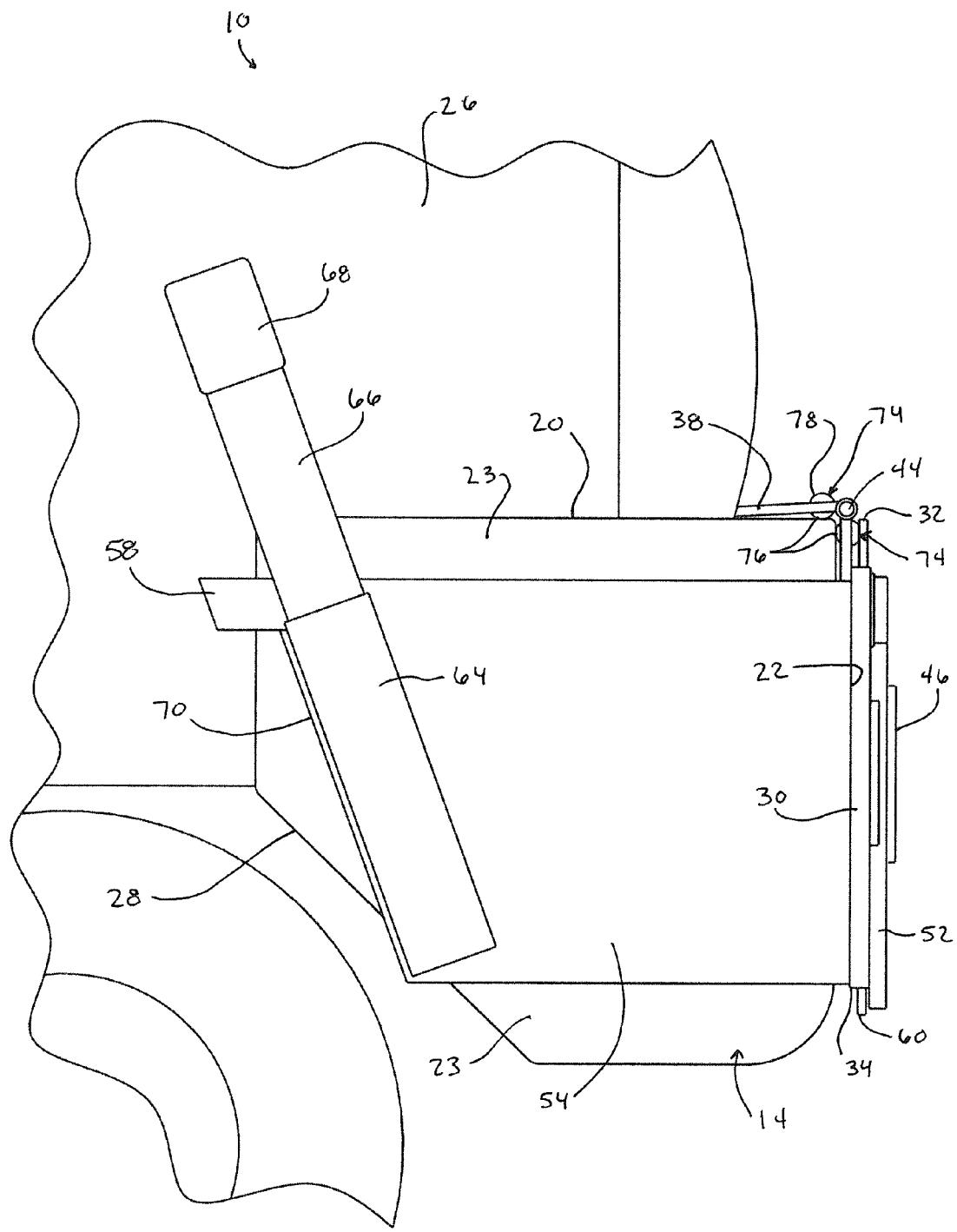
FIG. 9 is a side view of the automobile of FIGS. 6 through 8 showing the bumper protector wrapped around one of the lateral ends of the bumper.

As seen from FIGS. 7 and 8, after the wing extensions 54 are deployed, sheaths 64 mounted to distal ends of the wing extensions 54 are exposed, from which extension straps 66 can be deployed as shown in FIG. 8. Each extension strap 66 comprises a securement pad 68 that can be used to secure the wing extensions 54 in their deployed positions, for example, by magnetically securing the extension straps 66 to the rear quarter panels 26 of the automobile 10 as shown in FIGS. 1 and 9. In so doing, the wing extensions 54 can be used to cover and protect portions and preferably the majority of the two lateral surface regions 23 of the bumper 14, while the mat 30 covers and protects at least a portion and preferably the majority of the rear surface 22 of the bumper 14. As seen in FIGS. 7 and 8, each distal end of the wing extensions 54 defines an edge 70, the sheaths 64 are disposed adjacent the edges 70 of their respective wing extensions 54, and the sheaths 64 are inclined at an angle to vertical so that the extension straps 66, when deployed from openings 72 located at upper ends of the sheaths 64, are deployed in directions upward and laterally outward from the mat 30.

Figure 6:
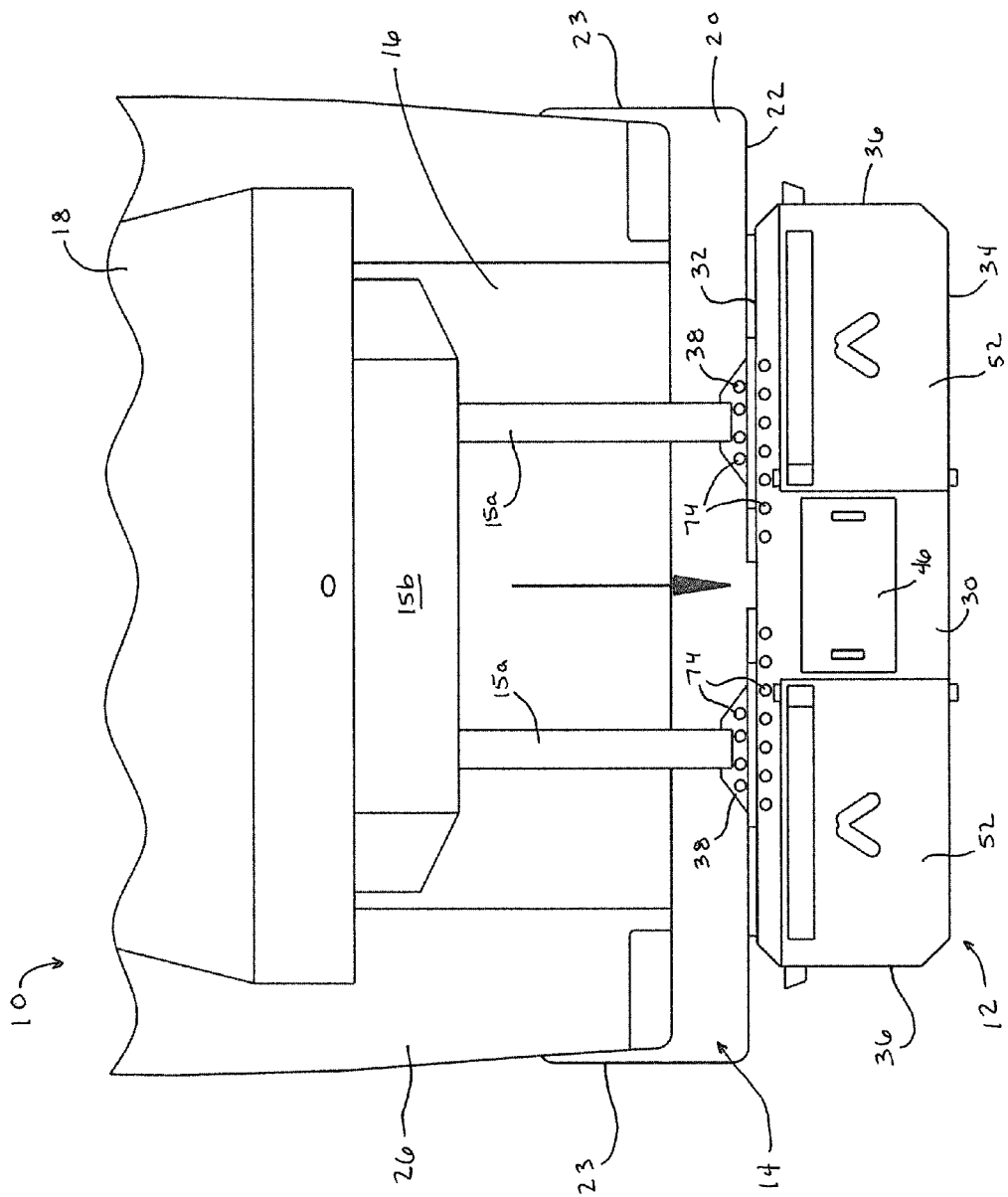
FIG. 6 is a top view of the trunk area of an automobile depicting an initial step performed during installation of the bumper protector of FIGS. 1 through 5 on the automobile.

As most apparent from in FIGS. 1, 6 and 9, the mat 30 can be positioned on the bumper 14 so that the flanges 38 overlie the upper surface 20 of the bumper 14, and the mat 30 is suspended from the upper surface 20 as a result of the pivotal coupling defined by the rod 44 and channels 40 and 42, which effectively define a pair of hinges. As depicted in the drawings and in particular FIGS. 5 and 9, the flanges 38 and the upper end 32 of the mat 30 preferably do not directly contact the bumper 14, but instead are spaced apart with rolling contact units 74. Each flange 38 is represented as being equipped with four units 74 and the upper end 32 of the mat 30 is represented as being equipped with seven units 74, though the use of fewer and greater numbers of units 74 is foreseeable. Various constructions are foreseeable for the rolling contact units 74, but in general each unit 74 comprises a ball 76 rotatably retained within one of the flanges 38 or mat 30, for example, with a pocket or housing 78 formed by or attached to one of the flange 38 or the mat 30. Free rotation of each ball 76 can be promoted in any suitable manner, for example, multiple roller bearings (not shown) that surround each ball 76 within its housing 78. Each ball 76 is disposed on an interior face of its flange 38 or mat 30, in other words, so that the ball 76 faces and is able to directly contact one of the surfaces 20 and 22 of the bumper 14. In this manner, the surfaces 20 and 22 are not prone to be damaged by the mat 30 and flanges 38 of the protector 12. As particularly evident from FIG. 9, the hinge defined by the rod 44 and channels 40 and 42 promotes a more contoured fit of the protector 12 over the upper edge of the bumper 14 between its upper and outer surfaces 20 and 22, but prevents direct contact between the protector 12 and the bumper's upper edge.

As should be evident from the above discussion, installation and use of the bumper protector 12 depicted in the drawings can generally be understood from the series of steps represented in FIGS. 6 through 9. An arrow in FIG. 6 indicates that the protector 12 has been removed from the trunk 16 and extended to the extent permitted by the trunk straps 15a. At this time, the flanges 38 are already disposed above the upper surface 20 of the bumper 14 and their rolling contact units 74 may already be in contact and resting on the upper surface 20. FIG. 7 shows the mat 30 after being rotated downward about the hinge axis defined by the rod 44 that pivotally couples the mat 30 to the flanges 38. FIG. 7 also shows the wing extensions 54 as having been deployed laterally outward from their respective compartments 52, with the maximum extent of their deployment being established with the travel of the tabs 60 in their respective slots 62. FIG. 8 depicts the deployment of the extension straps 66 from their respective sheaths 64, and FIG. 9 depicts the securement of the wing extensions 54 around the lateral surface regions 23 of the bumper 14 with the use of the securement pads 68.

In view of the above, though the mat 30 can be sized to be readily accommodated with the trunk 16, the wing extensions 54 of the protector 12 result in the effective lateral length of the protector 12 being greatly extended, for example, by up to 50% or more, so that the protector 12 can be wrapped around the lateral corners of the bumper 14 to protect its lateral surface regions 23, in addition to the rear surface 22 of the bumper. The wing extensions 54 protect the lateral corners of the bumper 14 from damage commonly sustained from tight street parking situations.

Securement of the wing extensions 54 to the automobile 10 is preferably magnetically achieved with the straps 66, which provide a convenient means for temporarily securing the extensions 54 to the metal surfaces of the rear quarter panels 26 of the automobile 10 in a manner that is able to support the weight of the wing extensions 54 and avoid their contact with the ground. Though magnetic attachment is believed to be preferable, other means for supporting the wing extensions 54 are possible and within the scope of the invention.

The protector 12 also preferably provides a hinge system that pivotally connects the mat 30 to the trunk straps 15a through the flanges 38, and preferably provides rolling contact units 74 that are located on the flanges 38 and along the upper end 32 of the mat 30 to protect the bumper 14 from being scuffed by the back side of the protector 12 facing the bumper 14. The hinge system, provided by the pivotal connection between the flanges 38 and mat 30, promotes a contoured fit of the protector 12 over the upper edge of the bumper 14 between its upper and outer surfaces 20 and 22, where the pivot axis of the rod 44 is located so that the mat 30 is able to hang vertically without resting on the upper surface 20 or upper edge of the bumper 14. The rolling contact units 74 enable the protector 12 to be spaced apart from the surfaces 22 and 23 of the bumper 14, thereby minimizing contact and allowing the protector 12 to roll across the surfaces 22 and 23 in the event that the mat 30 is caused to move relative to the bumper 14. Though a hinged system and roller contact units 74 are believed to be preferred components for achieving these capabilities, other means for performing these functions are possible and within the scope of the invention.

Another preferred feature of the protector 12 is the convenience of a sliding license plate cover 46 that can be opened or closed depending on whether the automobile 10 has a trunk-mounted or bumper-mounted rear license plate. Though the configuration of the cover 46 and its ability to be readily stowed in an internal cavity within one of the compartments 52 are believed to be preferred, other configurations for the cover 46 and the manner in which the license plate opening 48 can be selectively and repeatedly exposed and concealed are possible and within the scope of the invention.

While the invention has been described in terms of a specific embodiment, it is apparent that other forms could be adopted by one skilled in the art. For example, the physical configuration of the protector 12, including its various components and features, could differ from that shown, and various materials and processes could be used to fabricate the protector 12 and its components. Furthermore, though described in reference to protecting a rear bumper of an automobile, it is foreseeable that the protector 12 could be employed to protect a front bumper or other region of an automobile. Therefore, the scope of the invention is to be limited only by the following claims.

The invention claimed is:

1. A protector for protecting a bumper of an automobile, the protector comprising:
   a main body having oppositely-disposed upper and lower ends and oppositely-disposed first and second lateral ends, the main body being adapted to cover at least a portion of an outer surface of the bumper that is between two lateral surfaces of the bumper and below an upper surface of the bumper;
   first securing means for securing the upper end of the main body to an automobile portion above the bumper;
   first and second compartments located on the main body adjacent, respectively, the first and second lateral ends of the main body;
   wing extensions configured to be deployed from the main body, each of the wing extensions having a stowed position in which the wing extension is stowed in a cavity of a corresponding one of the first and second compartments of the main body and each of the wing extensions having a deployed position in which the wing extension is extended from the cavity of the first or second compartment and deployed from a corresponding one of the first and second lateral ends of the main body, the wing extensions being adapted to cover at least portions of the lateral surfaces of the bumper; and
   second securing means for securing the wing extensions to the automobile.

2. The protector according to claim 1, wherein the main body is a mat.

3. The protector according to claim 1,
   wherein the wing extensions are sized and configured to cover and protect a majority of the lateral surfaces of the bumper.

4. A protector for protecting a bumper of an automobile, the protector comprising:
   a main body having oppositely-disposed upper and lower ends and oppositely-disposed lateral ends, the main body being adapted to cover at least a portion of an outer surface of the bumper that is between two lateral surfaces of the bumper and below an upper surface of the bumper; and
   first securing means for securing the upper end of the main body to an automobile portion above the bumper;
   wherein the first securing means comprises at least one flange pivotally coupled to the upper end of the main body.

5. The protector according to claim 4, further comprising at least one hinge that pivotally couples the flange to the upper end of the main body.

6. The protector according to claim 4, wherein the first securing means comprises at least one strap attached to the flange and adapted to secure the upper end of the main body from a trunk of the automobile.

7. The protector according to claim 1, wherein the second securing means comprise straps configured to be deployed from the wing extensions.

8. The protector according to claim 7, wherein each of the straps has a stowed position in which the strap is stowed in a corresponding one of the wing extensions and has a deployed position in which the strap is deployed from the wing extension in directions upward and laterally outward from the main body.

9. The protector according to claim 8, further comprising sheaths from which the straps are deployed from the wing extensions to achieve the deployed position and into which the straps are retracted to achieve the stowed position.

10. The protector according to claim 7, wherein the second securing means further comprise means for magnetically securing the straps to the automobile.

11. A protector for protecting a bumper of an automobile, the protector comprising:
   a main body having oppositely-disposed upper and lower ends and oppositely-disposed lateral ends, the main body being adapted to cover at least a portion of an outer surface of the bumper that is between two lateral surfaces of the bumper and below an upper surface of the bumper;
   first securing means for securing the upper end of the main body to an automobile portion above the bumper;
   rolling contact units adapted to space the main body apart from the outer surface of the bumper.

12. A protector for protecting a bumper of an automobile, the protector comprising:
   a main body having oppositely-disposed upper and lower ends and oppositely-disposed lateral ends, the main body being adapted to cover at least a portion of an outer surface of the bumper that is between two lateral surfaces of the bumper and below an upper surface of the bumper;
   first securing means for securing the upper end of the main body to an automobile portion above the bumper;
   rolling contact units adapted to space at least a portion of the first securing means apart from the upper surface of the bumper.

13. A protector for protecting a bumper of an automobile, the protector comprising:
   a main body having oppositely-disposed upper and lower ends and oppositely-disposed lateral ends, the main body being adapted to cover at least a portion of an outer surface of the bumper that is between two lateral surfaces of the bumper and below an upper surface of the bumper;
   first securing means for securing the upper end of the main body to an automobile portion above the bumper;
   a cover that closes a license plate opening centrally disposed in the main body between the lateral ends of the main body; and
   a cover that slides relative to the main body along a track to selectively cover the license plate opening and selectively uncover the license plate opening to expose therethrough a license plate of the automobile.

14. The protector according to claim 1, wherein the protector is installed on the bumper so that the main body covers the outer surface of the bumper, the wing extensions cover the lateral surfaces of the bumper, and the second securing means secure the wing extensions to the automobile.

15. The protector according to claim 14, wherein the lateral surfaces face laterally outward away from the outer surface.

16. The protector according to claim 14, further comprising rolling contact units that space the main body apart from the outer surface of the bumper.

17. The protector according to claim 14, further comprising rolling contact units that space at least a portion of the first securing means apart from the upper surface of the bumper.

18. The protector according to claim 14, further comprising an opening that is centrally disposed in the main body between the lateral ends of the main body, and a cover that slides relative to the main body along a track to selectively cover the license plate opening and selectively uncover the license plate opening to expose therethrough a license plate of the automobile.

19. A method of using the protector according to claim 1, the method comprising:
   securing the upper end of the main body to the automobile portion above the bumper;
   covering at least a portion of the outer surface of the bumper with the main body;
   deploying the wing extensions from the main body by extending each of the wing extensions from the stowed position thereof within the cavities of the first and second compartments to the deployed position thereof in which the wing extensions are extended from the cavities;
   covering at least portions of the lateral surfaces of the bumper with the wing extensions; and
   securing the wing extensions to the automobile.

20. A method of protecting a bumper of an automobile, the bumper having an outer surface between two lateral surfaces of the bumper and below an upper surface of the bumper, the method comprising:
   providing a bumper protector comprising a main body that has oppositely-disposed upper and lower ends and oppositely-disposed lateral ends;
   securing the upper end of the main body to an automobile portion above the bumper;
   covering at least a portion of the outer surface of the bumper with the main body;
   deploying wing extensions from the main body by extending each of the wing extensions from a stowed position thereof in which the wing extensions are stowed with the main body to a deployed position thereof in which the wing extensions are deployed from a corresponding one of the lateral ends of the main body;
   covering at least portions of the lateral surfaces of the bumper with the wing extensions; and
   securing the wing extensions to the automobile.

\* \* \* \* \*